June 7, 1927.
J. L. HOYLE
ELECTRIC METER COVER
Filed Nov. 2, 1925
1,631,684
2 Sheets-Sheet 1
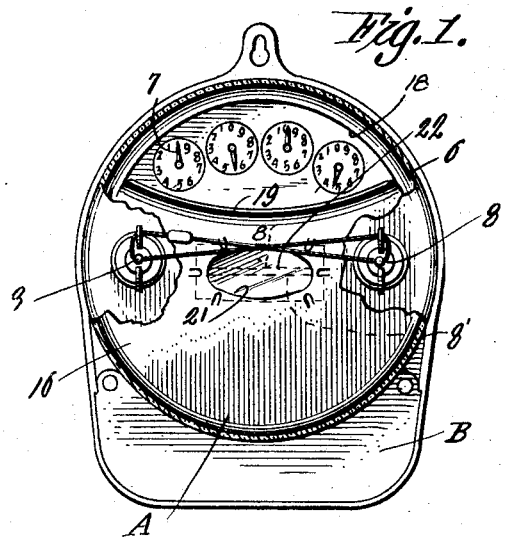
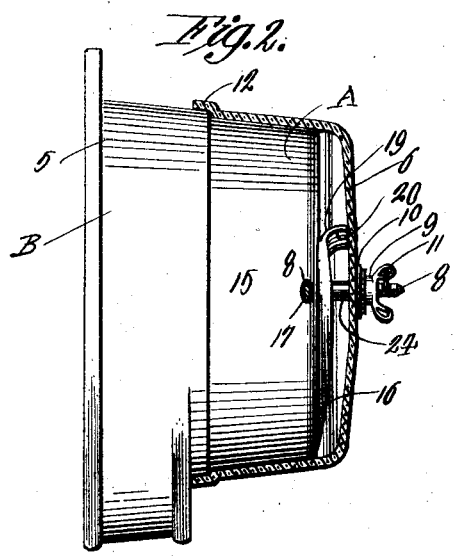
WITNESSES
JOHN L. HOYLE Inventor
By Richard B. Owen Attorney June 7, 1927.
J. L. HOYLE
1,631,684
ELECTRIC METER COVER
Filed Nov. 2, 1925
2 Sheets-Sheet 2
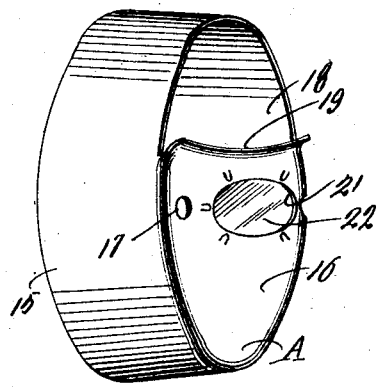
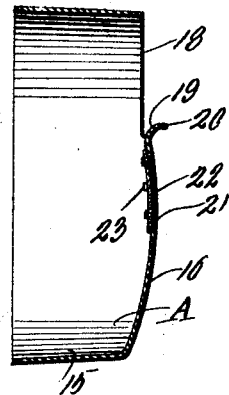
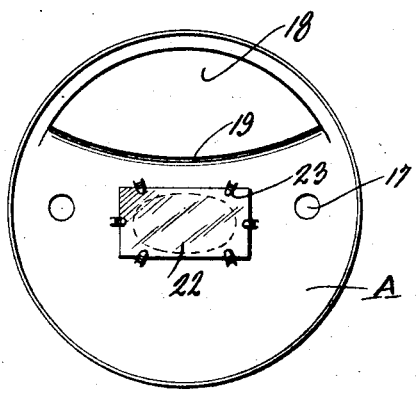
WITNESSES
Inventor
JOHN L. HOYLE
By Richard B. Owen
Attorney Patented June 7, 1927.

1,631,684

UNITED STATES PATENT OFFICE.

JOHN L. HOYLE, OF NEW ORLEANS, LOUISIANA.

ELECTRIC-METER COVER.

Application filed November 2, 1925. Serial No. 66,429.

This invention appertains to electric meters and the primary object of the invention is to provide a novel attachment therefor for effectively preventing unscrupulous persons stopping the meter from registering and thus using the current without paying for the same.

Another object of the invention is the provision of a novel cover for electric meters, which is so associated with the meter that all possibility of the insertion of foreign implements into the meter in engagement with the operating parts thereof is entirely eliminated, the cover permitting of the viewing of the registering indicators and the operating dial at all times.

A further object of the invention is the provision of a novel metallic cover adapted to be incorporated with a meter intermediate the usual transparent dust cover and operating parts of the meter, said protecting cover forming a shield for preventing the inserting of foreign implements, such as wires and the like between the dust cover and the base of the meter in engagement with the indicating registers and operating dial.

A still further object of the invention is to provide an improved device of the above character, which will be durable and efficient in use, one that will be simple and easy to manufacture and one which can be incorporated with a standard electric meter at a small cost.

With these and other objects in view, the invention consists in the novel construction, arrangement and formation of parts, as will be hereinafter more specifically described, claimed and illustrated in the accompanying drawings, in which drawings, Figure 1 is a front elevation of a meter showing the improved protecting cover incorporated therewith, the dust cover of the meter being shown in section, Figure 2 is an edge elevation of the meter showing the novel protecting cover incorporated therewith, the transparent dust cover being shown in diametric section, Figure 3 is a perspective view of the improved protecting cover, Figure 4 is a diametric section through the same, Figure 5 is a rear elevation of the improved protecting cover.

Referring to the drawings in detail, wherein similar reference characters designate corresponding parts throughout the several views the letter A generally indicates the improved protecting cover for a standard meter B.

The meter B embodies the usual base 5 which supports the ordinary registering mechanism of the meter which is normally covered by the transparent dust cover 6. The registering parts of the meter include the usual registering indicators or dials 7 from which the reading of the meter is taken and the horizontal dial indicated in dotted lines at 8' which can be observed by the electric company to see if the meter is functioning properly.

The meter B supports the outwardly extending spaced screws 8 which extend over suitable openings formed in the transparent dust cover 6. The dust cover is held in place by thumb nuts 9 threaded on the screws 8.

It has been found by unscrupulous persons that thin implements such as whale bone, wire and the like can be inserted between the dust cover and the base 5 of the meter to bring about the stopping of the registering indicator or dial 7. Wires can also be inserted between the supporting bolts 8 and the walls of the openings formed in the dust cover 6 and these wires can then be readily brought into contact with the horizontal dial 8' and thus prevent operation of the meter. Suitable flexible washers 10 are disposed upon the bolts 8 and are arranged between the dust cover 6 and the nuts 9. These washers are simply flexed and the wires can then be readily inserted within the dust cover.

The improved protecting cover A can be stamped or otherwise formed from sheet metal and comprises the annular side wall 15 and the front concavo-convex wall 16. The front wall 16 is provided with a pair of spaced openings 17 which receive the bolts 8, as will be hereinafter more fully described. The upper portion of the front wall 16, is cut away to provide an enlarged opening 18 to permit the registering indicator 7 to be readily seen, as will be hereinafter more fully described. The extreme upper edge of the front wall 16 is provided with a bent out stop flange 19 which is of an arcuate shape in cross section. It is to be noted that this flange 19 is provided with a slight depending lip 20 which is adapted to engage the inner face of the dust cover 6, as will be also hereinafter more fully described. The protecting cover A also has the front wall 16 thereof below the flange 19 provided with a sight opening 21 to permit the horizontal dial of the meter to be readily seen. This sight opening 21 is covered by a transparent panel 22 held in place by suitable struck out bendable tongues 23.

In use of the improved cover the same is placed around the operating parts of the meter between the base 5 and the dust cover 6 with the supporting bolts 8 extending through the openings 17 in the front wall 16. Elastic spacing sleeves 24 are placed upon the bolts in engagement with the front face of the cover 15 after which the dust cover 6 is placed in position on the bolts 8. The thumb nuts 9 are now threaded on the bolts in tight engagement with the washers 10 and these nuts can be held in place against turning movement by the usual seal 11. The lip 20 engages the inner face of the dust cover 6 as clearly shown in Figure 2 of the drawing, while the inner edge of the side wall 15 of the protecting cover A engages the base 5 of the meter directly inward of the dust cover and the offset flange 12 thereof which overhangs the base 5 as also clearly shown in Figure 2 of the drawing.

By this construction it is obvious that when a wire or the like is inserted between the dust cover 6 and the base 5 that the same will strike the wall 15 of the protecting cover A and thus be prevented from engaging the operating parts of the meter. It is also obvious that when an attempt is made to insert a wire through the openings in the dust proof cover 6 that the said wire will engage the outer face of the projecting cover 16 and thus the dial 8 will be protected. If the wire is forced upwardly the same will engage flange 19 and the lip 20 and thus the attempt to engage the registering indicators 7 will be prevented.

Changes as to details may be made without departing from the spirit or the scope of this invention, but:—

What I claim as new is:—

1. The combination with an electric meter including a base and a transparent cover therefor, including a flange arranged to engage said base, of a protecting cover for the operating parts of the meter comprising a sheet metal body having an outer side wall arranged to engage the base inwardly of the flange of the transparent cover and of a width to extend across the inner face of the side wall of said cover to a point adjacent the front of the same, and a convex front wall covering substantially three-quarters of the lower forward portion of said protecting cover for overlying the operating parts of the meter and having a sight opening formed therein.

2. The combination with a meter embodying a base and a pair of outwardly extending supporting bolts, a dust cover for the operating parts of the meter having openings therein for receiving the bolts, of a sheet metal protecting cover arranged on the base having openings for receiving said supporting bolts, and disposed inwardly of the dust cover, a sight opening formed in the protecting cover for permitting the viewing of the registering indicators, and a curved lip carried by the cover formed below said openings for engagement with the inner face of the dust cover.

3. The combination with a meter including a base, spaced outwardly extending supporting bolts, registering indicators and a horizontal operating dial and a removable dust cover for the meter including an outer wall having openings therein for receiving the supporting bolts and a flange for engaging the outer face of the base, of a protecting cover for the operating parts of the meter including a sheet metal body embodying an annular side wall arranged to fit upon the base and a concavo-convex outer wall, said protecting cover being disposed between the working parts of the meter and the dust cover, the front wall of the protecting cover having an enlarged opening therein to permit the viewing of the registering indicators, an outwardly curved flange formed on the front wall of the protecting cover below said opening, a depending lip formed on the flange for engaging the inner face of the dust cover, the front wall of the protecting cover having a second sight opening therein for the horizontal operating dial, a transparent panel for said opening, the cover also having openings therein for receiving the supporting bolts, and flexible sleeves on said bolts arranged to engage the dust cover and the protecting cover.

4. As a new article of manufacture, a protecting cover for electric meters comprising a sheet metal body including an annular side wall and a concavo-convex front wall provided with an upper sight opening for permitting the indicating dial of a meter to be viewed, an arcuate flange formed on the front wall below said opening having a depending lip formed on the free end thereof, the front wall also having a sight opening below the first sight opening for permitting the viewing of the horizontal dial, a transparent panel for said last mentioned sight opening, and the front wall also having supporting bolt receiving openings.

In testimony whereof I affix my signature.

JOHN L. HOYLE.